(12) United States Patent
Barrau et al.

(10) Patent No.: US 11,644,689 B2
(45) Date of Patent: May 9, 2023

(54) OPHTHALMIC TINTED LENS

(71) Applicant: Essilor International, Charenton-le-Pont (FR)

(72) Inventors: Coralie Barrau, Charenton-le-Pont (FR); Montserrat Burgos, Charenton-le-Pont (FR); Natalia Schianchi, Italia (IT)

(73) Assignee: Essilor International, Charenton-le-Pont (FR)

( * ) Notice: Subject to any disclaimer, the term of this patent is extended or adjusted under 35 U.S.C. 154(b) by 469 days.

(21) Appl. No.: 16/969,628

(22) PCT Filed: Feb. 11, 2019

(86) PCT No.: PCT/EP2019/053262
§ 371 (c)(1),
(2) Date: Aug. 13, 2020

(87) PCT Pub. No.: WO2019/158464
PCT Pub. Date: Aug. 22, 2019

(65) Prior Publication Data
US 2020/0400975 A1    Dec. 24, 2020

(30) Foreign Application Priority Data
Feb. 15, 2018 (EP) .................................. 18305152

(51) Int. Cl.
*G02C 7/10* (2006.01)
(52) U.S. Cl.
CPC ............. *G02C 7/104* (2013.01); *G02C 7/108* (2013.01)

(58) Field of Classification Search
CPC ................................ G02C 7/108; G02C 7/104
(Continued)

(56) References Cited

U.S. PATENT DOCUMENTS 5,083,858 A * 1/1992 Girerd ..................... G02C 7/104
351/44
2013/0114036 A1    5/2013 Pritts

FOREIGN PATENT DOCUMENTS

DE    10 2007 007 777    6/2008
EP          3232254 A1 * 10/2017 ............. A61F 9/022
(Continued)

OTHER PUBLICATIONS

International Search Report for PCT/EP2019/053262 dated Mar. 18, 2019, 4 pages.
(Continued)

*Primary Examiner* — James R Greece
(74) *Attorney, Agent, or Firm* — Nixon & Vanderhye (57) ABSTRACT

An ophthalmic tinted lens has a visual transmission value TV for quantifying a first light intensity ratio which relates to light effective for human vision and transmitted through the lens in daylight condition, and also has a value of a chronobiological factor FC for quantifying a second light amount ratio which relates to light effective for a non-visual physiological effect and also transmitted through the lens in daylight condition. The TV-value and the FC-value expressed as percentage values meet the following condition: $FC > 1.1 \times TV + 13.0$ with $3\% \leq TV \leq 43\%$, or $FC > 0.7 \times TV + 32$ with $43\% < TV \leq 92\%$, for the ophthalmic tinted lens to combine solar protection and maintenance of circadian rhythms and better pupil constriction which are based on the non-visual physiological effect.

20 Claims, 4 Drawing Sheets

(58) Field of Classification Search
USPC .................................................. 351/159.65
See application file for complete search history.

(56) References Cited

FOREIGN PATENT DOCUMENTS

| WO | 97/20246 | 6/1997 |
| WO | 2016/118193 | 7/2016 |
| WO | 2017/108976 | 6/2017 |

OTHER PUBLICATIONS

Written Opinion of the ISA for PCT/EP2019/053262 dated Mar. 18, 2019, 7 pages.
"Ophthalmic optics—Spectacle lenses—Vocabulary", International Standard, vol. 13666, Aug. 1, 1998, 66 pages.

* cited by examiner

OPHTHALMIC TINTED LENS

This application is the U.S. national phase of International Application No. PCT/EP2019/053262 filed Feb. 11, 2019 which designated the U.S. and claims priority to EP Patent Application No. 18305152.3 filed Feb. 15, 2018, the entire contents of each of which are hereby incorporated by reference.

TECHNICAL FIELD OF THE INVENTION

The present invention relates to an ophthalmic tinted lens which improves retinal exposure to light effective for at least one non-visual physiological effect.

BACKGROUND OF THE INVENTION

Tinted eyeglasses are well-known for long time for protecting the eyes against excessive light, in particular excessive sun light. They are designed for filtering out UV light which is harmful for the human eyes, and also part of the visible light so as to avoid the wearer to be dazzled. But such reduction in the visible light causes the pupillary constriction to lessen, which increases in turn optical aberrations that exist in the image formed on the retina, and also reduces the depth of field. Therefore, by increasing the pupillary diameter, the tinted eyeglasses cause a reduction in the image quality of human vision.

Document US 2013/0114036 discloses a lens or shield suitable to provide protection to wearer's eyes from harmful part of the light spectrum, while selectively transmitting more of a certain wavelength range of the light spectrum that has a therapeutic benefit, such as healing or general mood modifier. Such lens or shield may have light transmittance values below 10% for wavelength values from 400 nm (nanometer) to 450 nm, and increased transmittance values in the wavelength range from 450 nm to 510 nm. In particular, lenses or shields disclosed in US 2013/0114036 have a relative transmittance maximum at around 460 nm to 490 nm, and substantially attenuate light by more than 50% in the wavelength range of about 510 nm to 600 nm.

But another issue relates to circadian rhythms of some human physiological functions. Indeed, there are non-visual physiological functions which are activated based on melanopsin, this latter being sensitive to part of the visible light which enters into the eyes. Melanopsin has a maximum light absorption range which extends between 460 nm and 510 nm for the light wavelength values, and entrance into the eyes of light within this wavelength range during the day participates in maintaining circadian rhythms for the physiological functions concerned. In particular, sleep disorders and mood disorders have been observed to occur in case of insufficient exposure to light with wavelength values between 460 nm and 510 nm.

From this situation, there is a need to have eyeglasses which provide an efficient protection against excessive light intensity, without causing disorders for physiological functions which are based on part of the light which enters into the eyes.

Another need relates to tinted eyeglasses which provide an appropriate trade-off between protection against blue-violet light hazard and transmission of light which is effective for non-visual physiological functions.

SUMMARY OF THE INVENTION

To this end, a first aspect of the invention proposes an ophthalmic tinted lens which has a visual transmission value $T_V$ for quantifying a first light intensity ratio which relates to light effective for human vision and transmitted through the lens in daylight condition, and also has a value of a chronobiological factor $F_C$ for quantifying a second light amount ratio which relates to light effective for a non-visual physiological effect and also transmitted through the lens. For the invention, the light which is effective for the non-visual physiological effect is also involved in the human vision. The $T_V$-value and the $F_C$-value are expressed as percentage values, namely both $T_V$- and $F_C$-values are ranging from 0 to 100. Then, the $T_V$- and $F_C$-values of the invention ophthalmic tinted lens meet the following condition: $F_C > 1.1 \times T_V + 13.0$ with $3\% \leq T_V \leq 43\%$, or $F_C > 0.7 \times T_V + 30.2$ with $43\% < T_V \leq 92\%$.

The visual transmission $T_V$ which is effective for human vision being less than 92% means than the invention lens is not clear, but it is efficient for reducing dazzling when ambient light intensity is important. Lower values for the visual transmission $T_V$ mean improved protection against dazzling. In particular, the value of the visual transmission $T_V$ being less than or equal to 43% and higher than 3% means that the tinted lens may be of class 2, 3 or 4 according to Standard ISO 8980-3.

The condition about the $F_C$-value being higher than a lower limit, this limit possibly varying with the $T_V$-value, means than the lens transmits the light which is effective for the non-visual physiological effect in a sufficient extent for ensuring that this effect still participates to at least one circadian biological rhythm. Higher values for the chronobiological factor $F_C$ mean that the non-visual physiological effect with its circadian rhythm is maintained in a greater extent.

In addition, the lower limit for the $F_C$-value depending on the value of the visual transmission $T_V$ expresses the trade-off between producing an efficient protection against excessive light intensity and maintaining the circadian rhythm for the non-visual physiological effect.

Furthermore, since the light which is effective for the non-visual physiological effect participates to enhancing the amplitude of pupillary constriction (i.e. reducing pupil size compared to standard sunglasses) and enhancing the sustainability of the pupillary constriction, the $F_C$-value being higher than the lower limit also ensures that the pupillary constriction is at least partly maintained by the invention tinted lens. The benefits of the pupillary constriction, including better retina protection, reduced optical aberrations and increased depth of field for the image which is formed on the retina, are also maintained as a consequence.

Preferably, the visual transmission value $T_V$ may be computed using the following first formula:

$$T_V = \frac{\int_{380\ nm}^{780\ nm} E_s(\lambda) \cdot V(\lambda) \cdot T(\lambda) \cdot d\lambda}{\int_{380\ nm}^{780\ nm} E_s(\lambda) \cdot V(\lambda) \cdot d\lambda} \tag{1}$$

where:
- $\lambda$ is the light wavelength within the visible range from 380 nm to 780 nm of the human vision;
- $T(\lambda)$ is the spectral transmittance value of the ophthalmic tinted lens at wavelength $\lambda$, expressed as a percentage value;
- $V(\lambda)$ is a value at wavelength $\lambda$ of a spectral sensitivity profile V of the human eye for photopic vision; and
- $E_s(\lambda)$ is a value at wavelength $\lambda$ of the spectral intensity distribution $E_s$ of the solar light.

The spectral transmittance T(λ) is expressed as a percentage value, namely ranging between 0 and 100. This leads to the $T_V$-value computed according to formula (1) to range from 0 to 100 too.

In the frame of the present invention, photopic vision means vision in daylight conditions. In particular, the spectral intensity distribution $E_s$ of the solar light which is used for computing the $T_V$-value according to formula (1) may match the CIE Standard illuminant D65.

Furthermore, the chronobiological factor $F_C$ may be an average value of the spectral transmittance values T(λ) across the wavelength range 460 nm to 510 nm, or 465 nm to 495 nm, these ranges corresponding to maximum sensitivity of melanopsin.

In particular, the chronobiological factor $F_C$ may be computed using one of the following formulae:

$$F_C = \frac{1}{50} \cdot \int_{460\,nm}^{510\,nm} T(\lambda) \cdot d(\lambda) \text{ or } F_C = \frac{1}{30} \int_{460\,nm}^{510\,nm} T(\lambda) \cdot d\lambda.$$

Generally for the invention, the ophthalmic tinted lens may further have a value of a blue-violet protection factor $F_{BV}$ for quantifying an efficiency of the lens to protect the human eye against hazard due to blue-violet solar light. This blue-violet protection factor $F_{BV}$ is computed as 100 minus another value which quantifies a third light amount ratio which relates to light belonging to the wavelength range 415 nm to 455 nm and also transmitted through the lens. Then, the $T_V$-value and the $F_{BV}$-value expressed as percentage values may meet the following condition: $F_{BV} > -0.7 \times T_V + 107$ if $10\% \leq T_V \leq 92\%$.

High values for the blue-violet protection factor $F_{BV}$ mean that the invention lens provides high protection against the retinal hazards of the blue-violet light.

Possibly, the blue-violet protection factor $F_{BV}$ may be computed as 100 minus an average value of the spectral transmittance values T(λ) across the wavelength range 415 nm to 455 nm, this range corresponding to maximum retinal hazard due to blue-violet light.

In particular, the blue-violet protection factor $F_{BV}$ may be computed using the following formula $$F_{BV} = 100 - \frac{1}{40} \cdot \int_{415\,nm}^{455\,nm} T(\lambda) \cdot d\lambda.$$

As before, the spectral transmittance values T(λ) which are expressed as percentage values ranging from 0 to 100 are to be used in this formula for obtaining the $F_{BV}$-value. This leads to the $F_{BV}$-value thus computed to range from 0 to 100 too.

Advantageously, the $F_C$-value and the $F_{BV}$-value expressed as percentage values may meet the following condition: $F_C > -1.0 \times F_{BV} + 124$.

Preferably, a global efficiency factor $F_{TOT}$ which is equal to a sum of the $F_C$-value and $F_{BV}$-value expressed as percentage values, divided by two, may be higher than 62%. This lower limit for the global efficiency factor $F_{TOT}$ indicates that the invention lens combines maintenance of at least one circadian rhythm related to the non-visual physiological effect, pupil constriction and sufficient protection against blue-violet light hazard.

A second aspect of the invention provides a solar protection equipment which comprises a spectacle frame suitable for fitting on a wearer's face, and two ophthalmic tinted lenses each in accordance with the first invention aspect. The ophthalmic tinted lenses are then mounted within the spectacle frame.

A third aspect of the invention proposes an ophthalmic tinted lens which has a light transmittance spectrum extending at least from 380 nm to 780 nm for the wavelength values λ. This lens comprises a light-absorbing material which is effective for producing the light transmittance spectrum, said light transmittance spectrum exhibiting:

a first transmission slot in which the light transmittance values T(λ) of the ophthalmic tinted lens increase from a first average transmittance value of less than $0.6 \cdot T_V$ at a first wavelength range comprised between 415 nm and 455 nm, up to a second average transmittance value comprised between 30% and 90% at a second wavelength range comprised between 465 nm and 495 nm. Preferably, the derivative of T(λ) with respect to the wavelength λ may be higher than $1.4\% \cdot nm^{-1}$ when calculated between the wavelength values 455 nm and 465 nm. When the visual transmission value $T_V$ is less than 43%, then the first average transmittance value may be less than 6%. When the $T_V$-value is higher than or equal to than 80%, the second average transmittance value may be greater than $1.0 \cdot T_V$; when the $T_V$-value is less than 80% but greater than or equal to 43%, the second average transmittance value may be greater than $1.1 \cdot T_V$, when the $T_V$-value is less than 43% but greater than or equal to 8%, the second average transmittance value may be greater than $1.7 \cdot T_V$; and when the $T_V$-value is less than 8% but greater than or equal to 3%, the second average transmittance value may be greater than $2.5 \cdot T_V$;

a second transmission slot in which the light transmittance values T(λ) of the ophthalmic tinted lens decrease from the second average transmittance value down to a third transmittance value forming a local minimum that is situated at a third wavelength value between 520 nm and 600 nm. Preferably, an absolute value of the λ-derivative of T(λ) may be higher than $0.5\% \cdot nm^{-1}$ when calculated between the wavelength values 510 nm and 520 nm; and a third transmission slot in which the light transmittance values T(λ) of the ophthalmic tinted lens increase from the third transmittance value up to a fourth transmittance value higher than 70% at a fourth wavelength value comprised between 750 nm and 780 nm.

The light-absorbing material which is effective for producing the light transmittance spectrum may incorporate a specific mix of dye(s) and absorber(s). In order to have the first average transmittance range T(λ) lower than $0.6 \cdot T_V$ at the first wavelength range between 415 nm and 455 nm, and get significantly high λ-derivative value of T(λ) calculated between the wavelength values 455 nm and 465 nm, at least one selective dye may be used, which absorbs in the range 415 nm-445 nm selectively when compared to the other range 465 nm-495 nm. In addition, to get the second transmittance value of between 30% and 90% at the second wavelength value between 465 nm and 495 nm but with significant high absolute value of the λ-derivative value of T(λ) calculated between the wavelength values 510 nm and 520 nm, at least one first absorber may be used, which absorbs in the range 525 nm-550 nm and/or around 585 nm, selectively when compared to said other range 465 nm-495 nm and also selectively with respect to the wavelength range 750 nm-780 nm. In particular embodiments of the invention, dyes absorbing at the same time in the ranges 415 nm-445 nm and 525 nm-550 nm, such as Exciton ABS 526, Yamada FDB002 and/or Gentex A102 may be used. The light transmission features of each dye and the light absorption features of each absorber may be measured when this dye or absorber is dissolved in Trivex™ matrix or in polyurethane, with a concentration of between 0.3 mg (milligram) to 15 mg per 100 g (gram) of Trivex™ or polyurethane, depending on the dye or absorber of concern, and also depending on an intended optical path length comprised between 0.8 mm and 2.2 mm.

Generally for the third invention aspect, the ophthalmic tinted lens may further have one or several of the following additional features:
- the at least one dye may comprise a chromophore derivative of one selected from quinophtalone, quinoline, coumarine and a mono-azo compound;
- the at least one first absorber may be a derivative of one selected from perylene and porphyrine;
- the light-absorbing material within the invention ophthalmic tinted lens may be based on polyurethane urea such as Trivex™, or based on polycarbonate;
- the light-absorbing material may further incorporate at least one second absorber, this second absorber having a second light absorption peak with a maximum absorption value produced at a second maximum absorption wavelength value comprised between 515 nm and 535 nm, and with a second value of full-width-at-half-maximum comprised between 15 nm and 25 nm;
- the light-absorbing material may further incorporate at least one third absorber, this third absorber having a third light absorption peak with maximum absorption value produced at a third maximum absorption wavelength value comprised between 570 nm and 590 nm, with a third value of full-width-at-half-maximum comprised between 15 nm and 25 nm;
- the respective concentrations of each dye and each absorber in the light-absorbing material may be such that the visual transmission value $T_V$ is less than or equal to 43%, and/or the transmission colorimetric parameter a* of the invention lens assessed according to CIE Standard has a value of between +10 and −40 depending on the lens color, for light according to illuminant D65 which is transmitted through the ophthalmic tinted lens. $T_V$-value less than 43% corresponds to tinted lens of category 2 (medium tint) or 3 (dark tint) or 4 (very dark tint) according to the standard ISO 8980-3; and
- the respective concentrations of each dye and each absorber in the light-absorbing material may be such that the visual transmission value $T_V$ of the ophthalmic tinted lens is higher than 43% in daylight condition, this visual transmission $T_V$ being assessed according to CIE Standard illuminant D65. This corresponds to tinted lens of category 0 (very light tint) or 1 (light tint) according to the standard ISO 8980-3.

A fourth aspect of the invention proposes a process for manufacturing an ophthalmic tinted lens, which comprises:
- selecting at least one dye which absorbs in the range 415 nm-445 selectively when compared to the other range 465 nm-495 nm;
- selecting at least one first absorber which absorbs in the range 525 nm-550 nm and/or around 585 nm, selectively when compared to said other range 465 nm-495 nm and also selectively with respect to the wavelength range 750 nm-780 nm;
- selecting a transparent lens base material intended to produce a light-absorbing material when the at least one dye and at least one first absorber are incorporated into this lens base material, the light-absorbing material thus producing the light transmittance spectrum from 380 nm to 780 nm for the wavelength values; and
- incorporating the at least one dye and at least one first absorber into the lens base material, with respective concentrations suitable for the transmittance values $T(\lambda)$ being lower than $0.6 \cdot T_V$ at the first wavelength average value between 415 nm and 455 nm, of between 30% and 90% at the second wavelength average value between 465 nm and 495 nm, and higher than 70% at the fourth wavelength value comprised between 750 nm and 780 nm.

The process may then further comprise producing the ophthalmic tinted lens based on the light-absorbing material which incorporates the at least one dye and at least one first absorber in accordance with their respective concentrations.

Other features and advantages of the invention will become more apparent from the embodiment examples which are described hereafter, for illustration purpose but without limiting the invention.

DETAILED DESCRIPTION OF THE INVENTION

Figure 1:
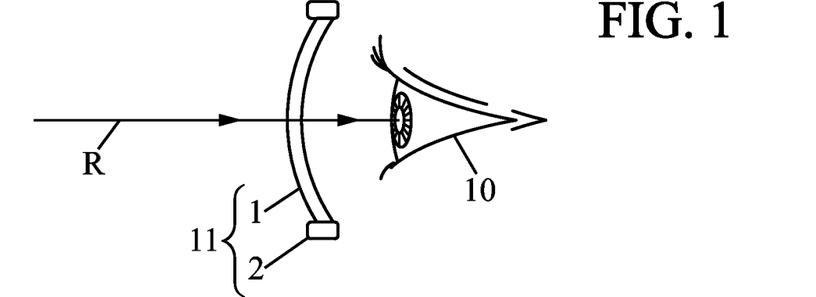
FIG. 1 is a general view of an ophthalmic tinted lens and a solar protection equipment according to the present invention.

In FIG. 1, reference number 1 denotes an ophthalmic tinted lens which is exposed to impinging light. The light ray R passes through the lens 1 and enters into the eye 10 of a wearer who is equipped with the ophthalmic tinted lens 1. To this purpose, the lens 1 is mounted into a spectacle frame 2 so as to form the solar protection equipment 11.

The spectral light transmittance $T(\lambda)$ of the ophthalmic tinted lens 1 can be measured in a well-known manner, for example using a spectrophotometer. As a non-limiting example, the light ray R may be oriented perpendicular to the lens 1 during the measurements. Then, the visual transmission $T_V$ of the lens 1, which quantifies the intensity ratio of the light which participates to human photopic vision, may be calculated using the above formula (1), where the spectral intensity values of the illuminant D65 may be used for the spectral intensity distribution $E_s$, as defined by the standard ISO 8980-3:2013. The spectral sensitivity profile V of the human eye for photopic vision is defined by CIE Standard ISO 10526:1999/CIE 5005/E-1998.

The chronobiological factor $F_C$ may be provided generally by the following second formula:

$$F_C = \frac{\int_{m_1}^{m_2} E_s(\lambda) \cdot M(\lambda) \cdot T(\lambda) \cdot d\lambda}{\int_{m_1}^{m_2} E_s(\lambda) \cdot M(\lambda) \cdot d\lambda} \quad (2)$$

where:
- $m_1$ and $m_2$ are two first wavelength limits comprised between 380 nm and 780 nm, or equal to 380 nm or 780 nm, with $m_1$ less than $m_2$; and
- $M(\lambda)$ is a value at wavelength $\lambda$ of a spectral sensibility profile M of the non-visual physiological effect, for the wavelength ranging from $m_1$ to $m_2$.

The $F_C$-value thus computed ranges from 0 to 100, since the spectral transmittance values $T(\lambda)$ to be inputted in formula (2) range from 0 to 100.

In preferred embodiments of the invention, the spectral intensity distribution $E_s$ of solar light, which is used for computing the $T_V$-value and $F_C$-value, may match the CIE Standard illuminant D65.

Possibly, $m_1$ may equal 380 nm and $m_2$ may equal 780 nm.

Figure 2A:
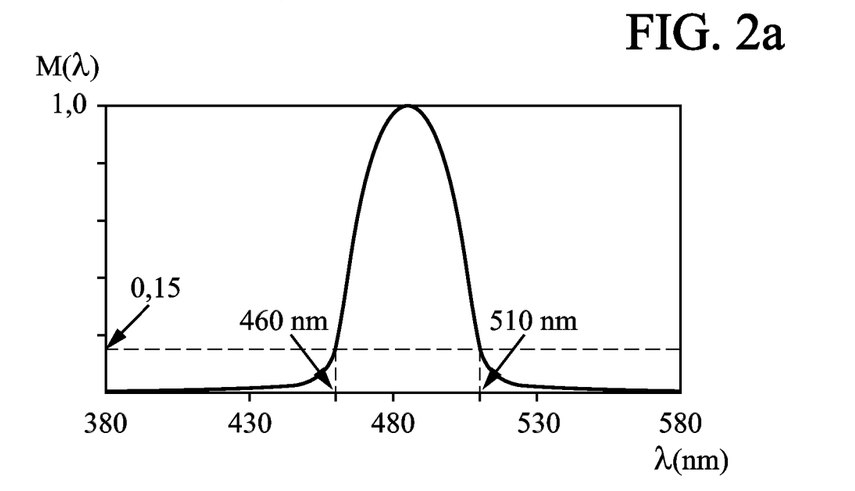
FIG. 2a is a spectral absorption diagram of melanopsin.

When the chronobiological factor $F_C$ is directed to at least one melanopsin-based physiological effect, the spectral sensitivity profile M may be a spectral absorption profile of melanopsin. In this way, the $F_C$-value quantifies an efficiency of the invention tinted lens to maintain at least one circadian rhythm for a melanopsin-based physiological effect. FIG. 2a reproduces a spectral absorption of melanopsin as recovered from widely available documents. The horizontal axis of this diagram indicates the wavelength values $\lambda$ in nanometers, and the vertical axis indicates the melanopsin absorption values, corresponding to $M(\lambda)$. The melanopsin absorption values for both wavelength values 460 nm and 510 nm are about 0.15 when the maximum absorption value is set to unity. So, the spectral sensitivity profile M for each wavelength value between 380 nm and 780 nm but outside the range from 460 nm to 510 nm, is much less than the maximum value of this spectral sensitivity profile M, such maximum value occurring for a value of the wavelength $\lambda$ which is comprised between 460 nm and 510 nm. Then, for a melanopsin-based physiological effect, the chronobiological factor $F_C$ can be more focused on the melanopsin absorption range when $m_1$ equals 460 nm and $m_2$ equals 510 nm, or $m_1$ equals 465 nm and $m_2$ equals 495 nm.

So, when the non-visual physiological effect which is considered is based on melanopsin, the spectral absorption profile of melanopsin can be used for the spectral sensibility profile M. Then, it may be considered that the $E_s(\lambda)$-values of the spectral intensity distribution of the solar light are almost constant across the wavelength range from 460 nm to 510 nm, and that the spectral sensitivity profile M has a crenel-shape with values $M(\lambda)$ which are almost equal to zero outside the wavelength range from 460 nm to 510 nm, and almost constant non-zero values $M(\lambda)$ between 460 nm and 510 nm. Then, these conditions lead to the $F_C$-value being computed as $$F_C = \frac{1}{50} \cdot \int_{460nm}^{510nm} T(\lambda) \cdot d\lambda$$

when $m_1$=460 nm and $m_2$=510 nm, which involves simplified and more rapid calculations. Similar reasons apply for using alternatively $m_1$=465 nm and $m_2$=495 nm.

Figure 3:
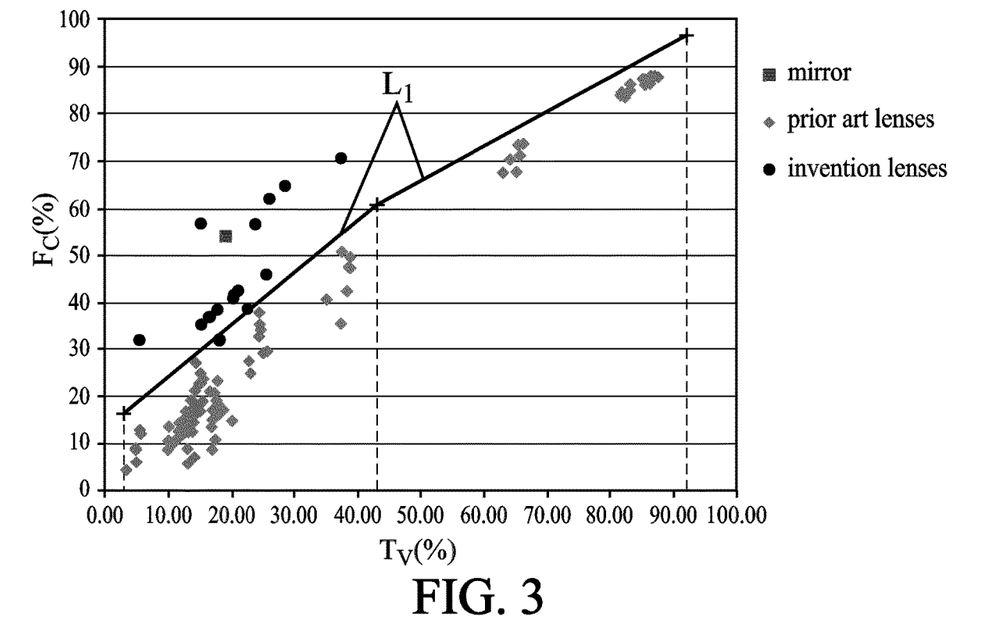
FIG. 3 is a first diagram which compares lenses according to the present invention with lenses existing prior to the invention, in $T_V$- and $F_C$-coordinates.

Low $T_V$-values indicate that the ophthalmic tinted lens reduces significantly the amount of visible light which enters into the wearer's eye, and high $F_C$-values indicate that the ophthalmic tinted lens produces good transmission for the light part which is effective for the non-visual physiological effect. In FIG. 3, the horizontal axis of the diagram displayed indicates the $T_V$-values, and the vertical axis indicates the $F_C$-values calculated according to the above simplified formula with $m_1$=465 nm and $m_2$=495 nm. The diagram compares in this first coordinate system, locations of lenses existing prior to the present invention to lenses which meet the invention. The left segment of the boundary $L_1$ corresponds to the condition $F_C$=1.1×$T_V$+13.0 for 3%≤$T_V$≤43%, and the right segment of the boundary $L_1$ corresponds to the condition $F_C$=0.7×$T_V$+30.2 for 43%<$T_V$≤92%. FIG. 3 thus shows that the lenses which existed before the present invention are located in the lower right part of the diagram, with respect to the boundary $L_1$, whereas the invention lenses are located in the upper left diagram part. This distribution indicates the improvement which is brought by the invention lenses for transmitting light which is effective for a melanopsin-based non-visual physiological effect, while producing a protection against dazzling.

The particular invention sample which is indicated with a square in the diagrams of FIGS. 3 to 6 and called Mirror will be described later.

When the non-visual physiological effect which is desired to be maintained while the wearer is equipped with the lens 1, is melanopsin-based, the sub-part of the spectral range of visible light to be transmitted efficiently through the lens is from about 460 nm to about 510 nm. However, it is well-known that the blue-violet light with wavelength values below 455 nm or 480 nm is harmful for the retina and participates to the ageing of the eye. It is therefore preferable that the lens 1 provides protection against such blue-violet light below 455 nm at the same time it provides efficient transmission between 460 nm and 510 nm. Then, the following formula (3) allows quantifying such protection against harmful blue-violet light:

$$F_{BV} = 100 - \frac{\int_{h_1}^{h_2} E_s(\lambda) \cdot B(\lambda) \cdot T(\lambda) \cdot d\lambda}{\int_{h_1}^{h_2} E_s(\lambda) \cdot M(\lambda) \cdot d\lambda} \quad (3)$$

where:
- $h_1$ and $h_2$ are two second wavelength limits comprised between 380 nm and 780 nm, or equal to 380 nm or 780 nm, with $h_1$ less than $h_2$; and
- $B(\lambda)$ is a value at wavelength $\lambda$ of a blue-violet hazard spectrum which matches Standard ISO 8980-3 or experimental photobiology data on retina, for example as defined by Arnault, Barrau et al. in the article entitled "Phototoxic Action Spectrum on a Retinal Pigment Epithelium Model of Age-related Macular Degeneration Exposed to Sunlight Normalized Conditions", PlosOne. 2013, for the wavelength $\lambda$ ranging from $h_1$ to $h_2$.

Figure 2B:
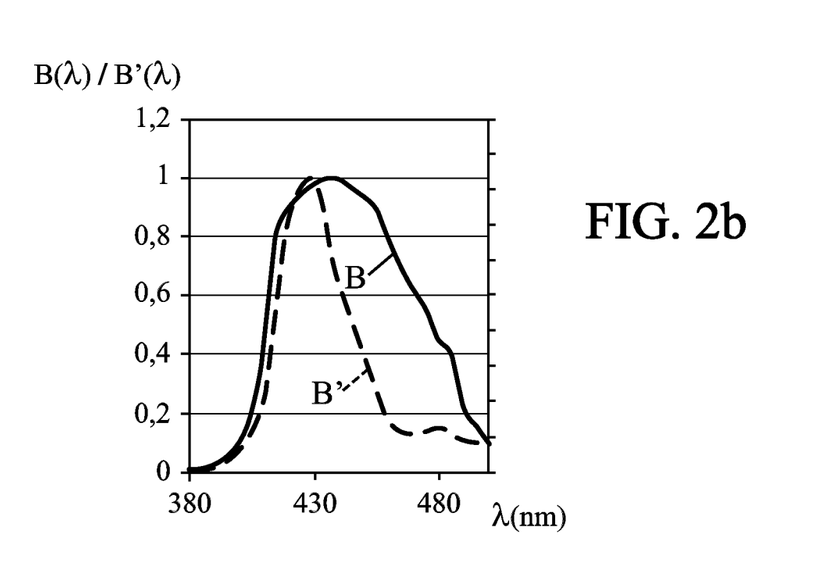
FIG. 2b is a diagram displaying two blue-violet hazard spectra.

The diagram of FIG. 2b shows two spectral profiles of the harmful blue-violet light, denoted $B(\lambda)$ and $B'(\lambda)$ respectively, and which can be used alternatively in formula (3).

The profile $B(\lambda)$ is that contained in Standard ISO 8980-3, and the profile $B'(\lambda)$ is that disclosed in the PlosOne reference indicated above.

Figure 4:
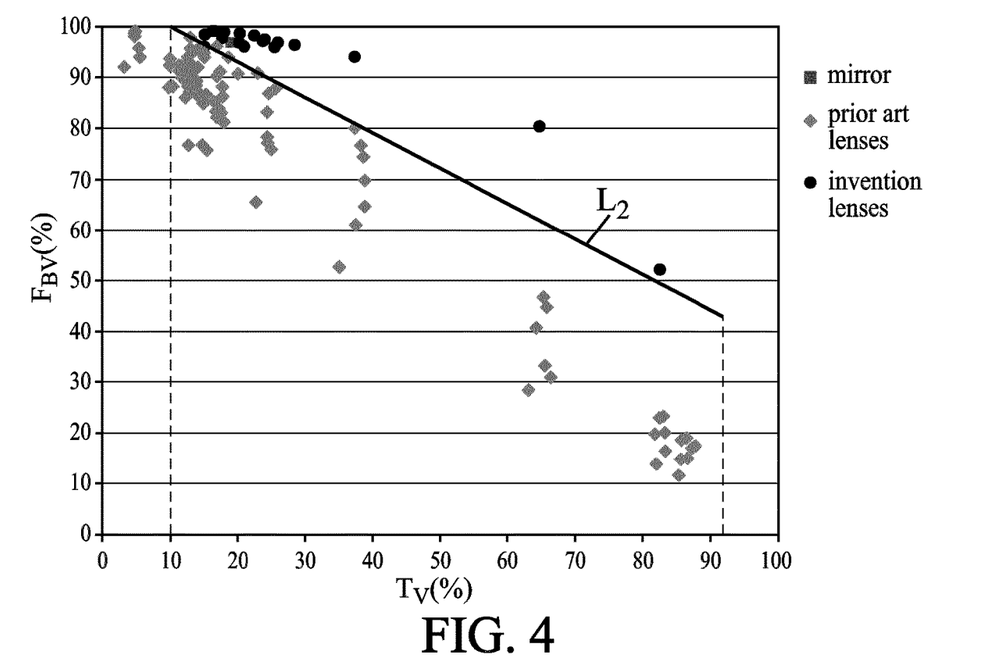
FIG. 4 is a second diagram which compares lenses according to the present invention with lenses existing prior to the invention, in $T_V$- and $F_{BV}$-coordinates.

In a way similar to that applied for the chronobiological factor $F_C$ as initially expressed according to formula (2), it may be considered that the $E_s(\lambda)$-values of the spectral intensity distribution of solar light are almost constant across the wavelength range from 415 nm to 455 nm, and that the harmful blue-violet profile $B(\lambda)$ or $B'(\lambda)$ is similar to a crenel-shape, with values which are almost equal to zero outside the wavelength range from 415 nm to 455 nm, and almost constant non-zero values between 415 nm and 455 nm. Then, the $F_{BV}$-value may be computed as $$F_{BV} = 100 - \frac{1}{40} \cdot \int_{415\,nm}^{455\,nm} T(\lambda) \cdot d\lambda,$$

which involves simplified and more rapid calculations. In FIG. 4, the horizontal axis of the diagram displayed indicates the $T_V$-values again, but the vertical axis indicates the $F_{BV}$-values calculated in this simplified way. The diagram compares in this second coordinate system, locations of the lenses existing prior to the present invention to the lenses which meet the invention. The continuous straight line $L_2$ corresponds to formula $F_{BV}=-0.7\times T_V+107$ for $10\%\leq T_V\leq 92\%$. FIG. 4 then shows that the lenses which existed before the present invention are located in the lower left part of the diagram, with respect to the boundary line $L_2$, whereas the invention lenses are located in the upper right diagram part. This distribution indicates the improvement which is brought by the invention lenses for protecting against the blue-violet light hazard while simultaneously producing an efficient protection against dazzling.

Figure 5:
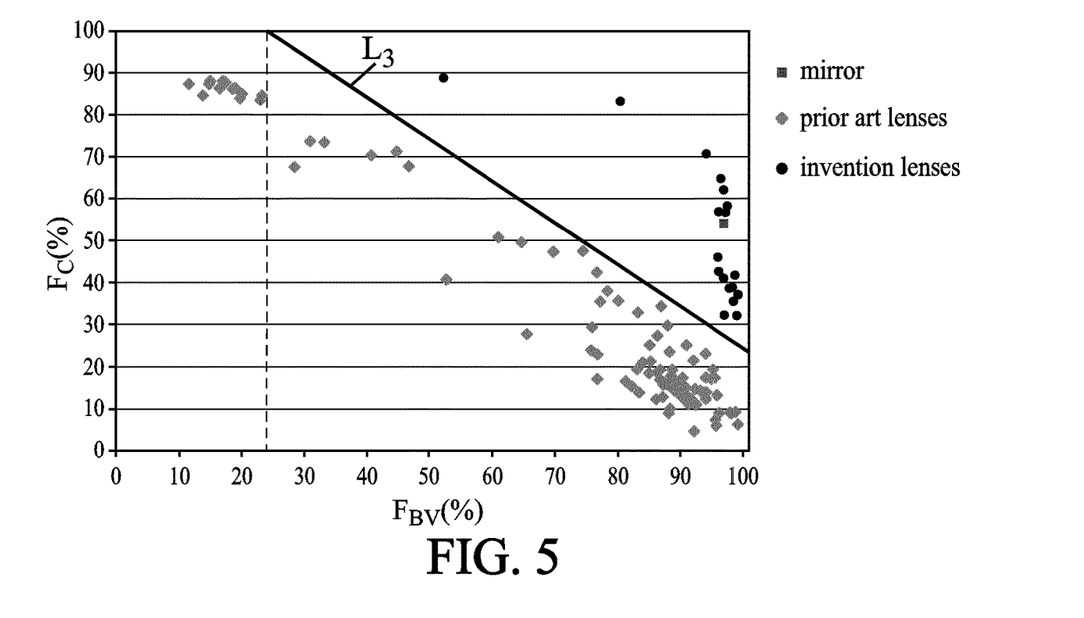
FIG. 5 is a third diagram which compares lenses according to the present invention with lenses existing prior to the invention, in $F_{BV}$- and $F_C$-coordinates.

In FIG. 5, the horizontal axis of the diagram displayed indicates the $F_{BV}$-values, and the vertical axis indicates the $F_C$-values. The diagram compares in this third coordinate system, locations of the lenses existing prior to the present invention to the lenses which meet the invention. The continuous straight line $L_3$ corresponds to formula $F_C=-1.0\times F_{BV}+124$. FIG. 5 then shows that the lenses which existed before the present invention are located mainly in the lower left part of the diagram, with respect to the boundary line $L_3$, whereas the invention lenses are located in the upper right diagram part. This distribution indicates the improvement which is brought by the invention lenses for producing an efficient protection against harmful blue-violet light while transmitting enough light effective for the melanopsin-based non-visual physiological effect.

Figure 6:
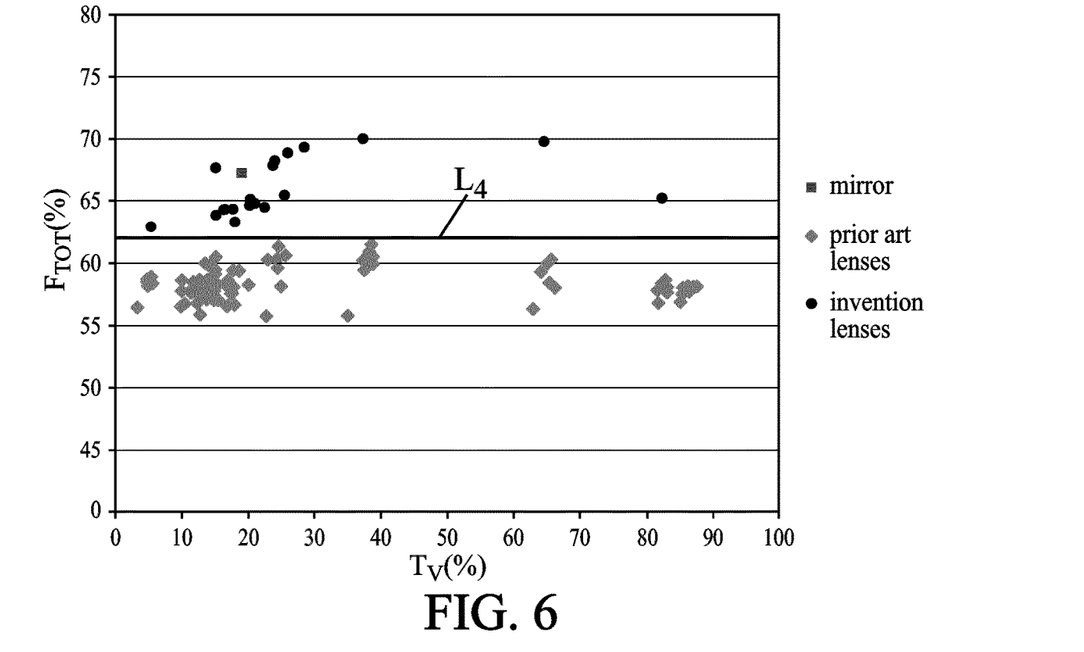
FIG. 6 is a fourth diagram which compares lenses according to the present invention with lenses existing prior to the invention, in and $T_V$- and $F_{TOT}$-coordinates.

The half-sum of both $F_C$- and $F_{BV}$-values quantifies the capability of a lens to provide an efficient protection against harmful blue-violet light and simultaneously transmitting light which is effective for the melanopsin-based non-visual physiological effect. In FIG. 6, the horizontal axis of the diagram displayed indicates the $T_V$-values, and the vertical axis indicates the values for $F_{TOT}=0.5\cdot(F_C+F_{BV})$. The diagram compares in this fourth coordinate system, locations of the lenses existing prior to the present invention to the lenses which meet the invention. The continuous straight line $L_4$ corresponds to $F_{TOT}=62\%$. The diagram shows that the lenses which existed before the present invention are located in the lower part of the diagram, with respect to the boundary line $L_4$, whereas the invention lenses are located in the upper diagram part. This distribution indicates the improvement which is brought by the invention lenses for producing efficient protection against harmful blue-violet light while being efficient for transmitting light effective for the melanopsin-based non-visual physiological effect.

Table 1 below recites the dies and absorbers that are used for three invention lenses which are labelled #1, #2 and #3, with their respective concentrations. For these three lenses, the lens base material is Trivex™ as supplied by PPG Industries, and which is based on polyurethane polymer. The concentrations are expressed in mg (milligram) of each dye or absorber for 100 g of the resulting blend of Trivex™ with the dies and absorbers. Commercial suppliers are also indicated between parentheses.

TABLE 1

| | | concentrations | | |
|---|---|---|---|---|
| dyes | absorbers | #1 | #2 | #3 |
| Solvent Green 3 | | 0 | 2.6 | 2.7 |
| Macrolex Green 5B (Lanxess AG)) | | 4 | 0 | 0 |
| Estofil Blue RR (Sandoz Ltd) | | 5 | 0 | 0 |
| Macrolex Yellow G (Lanxess AG) | | 1.8 | 2.5 | 2.1 |
| Macrolex Red H (Lanxess AG) | | 0 | 1.1 | 1 |
| Ancroplast Blue 2RC | | 0 | 7.6 | 6.4 |
| | Exciton ABS584L (Exciton) | 1 | 1.7 | 1.2 |
| Macrolex Violet 3R (Lanxess AG) | | 1 | 1.7 | 1.3 |
| | Exciton ABS526 (Exciton) | 1.5 | 1.9 | 1.6 |
| | Yamada FDB002 (Yamada Chemical Co., Ltd.) | 6 | 6.3 | 5.3 |
| | Gentex A102 (Gentex) | 0.5 | 0.8 | 0.7 |

These dyes and absorbers match the transmission and absorption features recited in the general part of the description for the third invention aspect. In particular, the dyes are mainly responsible for the shape of the lens transmittance profile for wavelength values between 380 nm and 460 nm, whereas the absorbers are mainly responsible for the shape of the lens transmittance profile for wavelength values between 510 nm and 780 nm. For reciting the connections with the general part of the invention description:

Macrolex Yellow G is a die which participates to obtaining a $T_V$-value of less than $0.6\cdot T_V$ at a first wavelength value between 415 nm and 455 nm;

Exciton ABS526, Yamada FDB002 and Gentex A102 are absorbers which are efficient for absorbing in the range 525 nm-550 nm; and Exciton ABS584L is another absorber which is efficient for absorbing in the range 570 nm-590 nm.

With these compositions, lens #1 is blue-green in transmission and has a transmission colorimetric a*-value which is equal to −35, lens #2 is greyish in transmission and has another transmission colorimetric a*-value which is equal to −7.8, and lens #3 is greyish in transmission too but with a*-value of −10.

A further ophthalmic tinted lens in accordance with the invention has been produced from the above lens #1, by applying the following transmission-selective stack on the convex face of this lens: silica ($SiO_2$): 41.4 nm (nanometer), zirconia ($ZrO_2$): 52.2 nm, silica: 117.4 nm and zirconia: 65.5 nm, and also by applying the antireflective coating called Crizal F® and produced by Essilor on the concave face of the lens. This further ophthalmic tinted lens has been labelled Mirror in FIGS. 3 to 6, and #1-Mirror/AR in table 2 below and FIG. 7.

Still another ophthalmic tinted lens in accordance with the invention has been produced from the lens #1, by applying the antireflective coating Crizal F® on both its concave and convex faces. The tinted lens thus obtained is labelled #1-AR/AR in table 2 below and FIG. 7.

With the dyes and absorbers of table 1 and their respective concentrations, the following numerical values have been obtained for the above described lenses, using the illuminant D65 and the calculation parameters indicated therein:

TABLE 2

|  |  | #1 | #2 | #3 | #1-AR/AR | #1-Mirror/AR |
|---|---|---|---|---|---|---|
| $T_V$ | 380 nm-780 nm | 24 | 17 | 20 | 26 | 19 |
| $F_C$ | Crenel-shape melanopsin absorption profile $m_1 = 465$ nm; $m_2 = 495$ nm | 58 | 37 | 42 | 62 | 54 |
| $F_{BV}$ | Crenel-shape hazard profile $h_1 = 415$ nm; $h_2 = 455$ nm | 98 | 99 | 99 | 97 | 97 |

Figure 7:
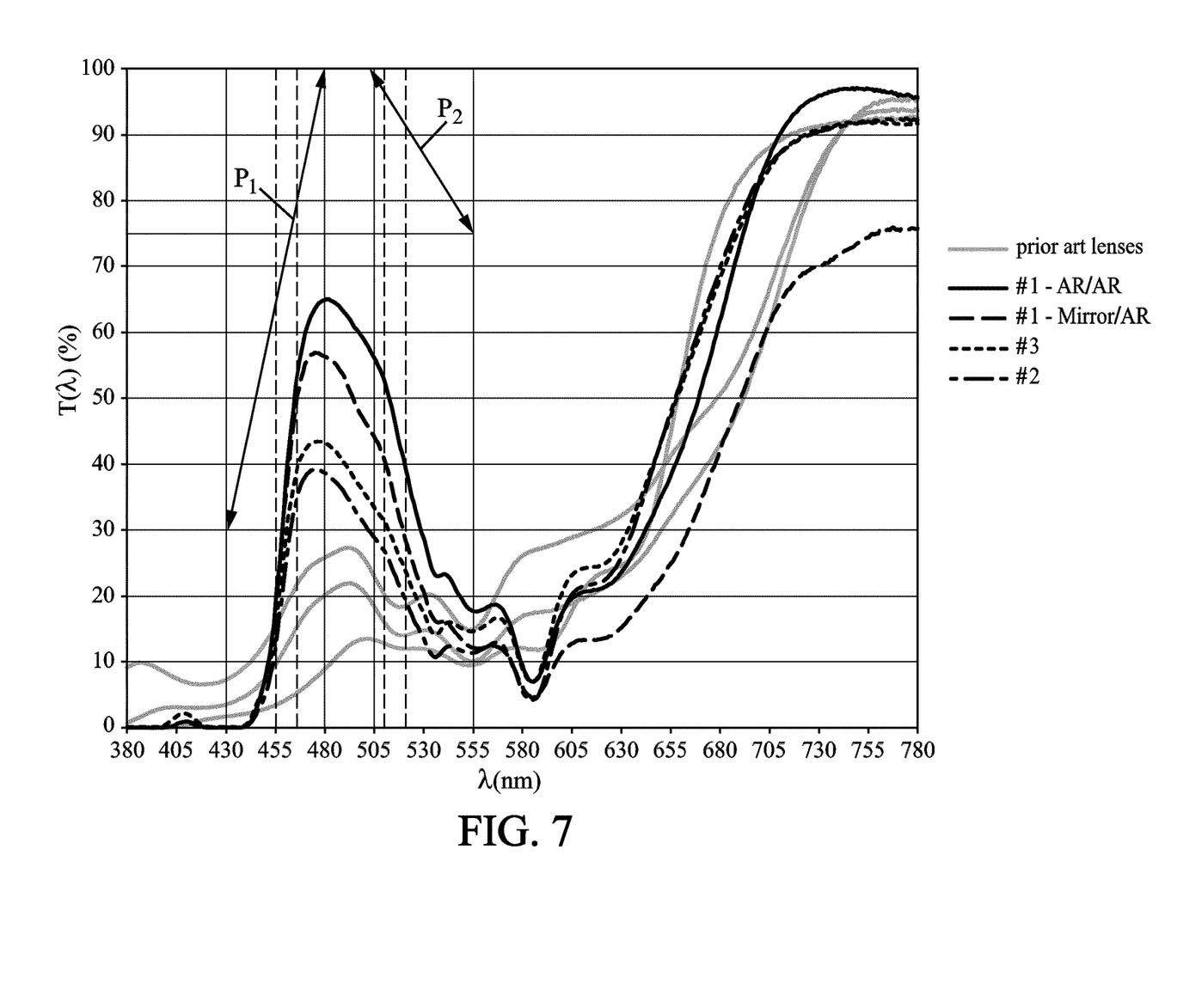
FIG. 7 is a diagram which compares respective light transmittance spectra of four lenses according to the present invention and three lenses existing prior to the invention.

FIG. 7 compares spectral light transmittance profiles of four among these invention lenses, with three lenses which existed before the invention. The horizontal axis indicates the wavelength values λ in nanometers, from 380 nm to 780 nm, and the vertical axis indicates the spectral light transmittance values T(λ) for all lenses. The thickness of the base lens material for the seven lenses is 2 mm (millimeter). It appears that the invention lenses exhibit profiles which are much more shaped, with lower transmittance values for wavelength values below 450 nm, higher transmittance values between 460 nm and 510 nm, and a deeper decrease of the transmittance between about 510 nm and 570 nm. The four invention lenses considered in FIG. 7 are #1-AR/AR, #1-Mirror/AR, #2 and #3. Each of them has a average transmittance value in the wavelength range 465 nm-495 nm which amounts to between 30% and 90%. Transmittance is higher than 70% in the range 750 nm-780 nm for all lenses represented.

FIG. 7 also shows the narrow wavelength ranges 455 nm-465 nm and 510 nm-520 nm, in which the slopes of the T(λ)-curves may be calculated. Line constructions are also provided for drawing a first slope $P_1$ equal to 1.4%·nm$^{-1}$ and a second slope $P_2$ equal to −0.5%·nm$^{-1}$. Then, it can be checked that the slopes of the transmittance curves for the four invention lenses are steeper than $P_1$ in the range 455 nm-465 nm, and the slopes in the range 510 nm-520 nm for the same curves are steeper than $P_2$.

In addition, clinical studies have shown that such ophthalmic tinted lens according to the invention causes a benefit in the pupillary amplitude of constriction of 50%, and in the constriction sustainability of 75%, vs a standard solar lens.

It is clear that the invention may be reproduced while modifying secondary aspects thereof with respect to the embodiments just described in detail, but maintaining the advantages cited. In particular, the chronobiological factor $F_C$ may be computed using summations restrained to the wavelength range from 465 nm to 495 nm, and the blue-violet protection factor $F_{BV}$ may be computed using summations restrained to the wavelength range from 415 nm to 455 nm.

The invention claimed is:

1. Ophthalmic tinted lens having a visual transmission value $T_V$ for quantifying a first light intensity ratio which relates to light effective for human vision and transmitted through the lens in daylight condition, and a value of a chronobiological factor $F_C$ for quantifying a second light amount ratio which relates to light effective for a non-visual physiological effect and also transmitted through the lens, the light effective for the non-visual physiological effect being also involved in the human vision, wherein the $T_V$-value and the $F_C$-value expressed as percentage values meet the following condition: $F_C > 1.1 \times T_V + 13.0$ with $3\% \leq T_V \leq 43\%$, or $F_C > 0.7 \times T_V + 30.2$ with $43\% < T_V \leq 92\%$.

2. The ophthalmic tinted lens according to claim 1, wherein the visual transmission value $T_V$ is computed using the following formula:

$$T_V = \frac{\int_{380\ nm}^{780\ nm} E_s(\lambda) \cdot V(\lambda) \cdot T(\lambda) \cdot d\lambda}{\int_{380\ nm}^{780\ nm} E_s(\lambda) \cdot V(\lambda) \cdot d\lambda}$$

where:
λ is light wavelength within the visible range 380 nm to 780 nm of the human vision,
T(λ) is a spectral transmittance value of the ophthalmic tinted lens at wavelength λ, expressed as a percentage value,
V(λ) is a value at wavelength λ of a spectral sensitivity profile V of a human eye for photopic vision, and
$E_s(\lambda)$ is a value at wavelength λ of a spectral intensity distribution $E_s$ of solar light,
and the chronobiological factor $F_C$ is an average value of the spectral transmittance values T(λ) across the wavelength range 460 nm to 510 nm, or 465 nm to 495 nm, said range corresponding to maximum sensitivity of melanopsin.

3. The ophthalmic tinted lens according to claim 2, wherein $$F_C = \frac{1}{50} \cdot \int_{460\ nm}^{510\ nm} T(\lambda) \cdot d(\lambda) \text{ or } F_C = \frac{1}{30} \cdot \int_{465\ nm}^{495\ nm} T(\lambda) \cdot d\lambda.$$

4. The ophthalmic tinted lens according to claim 2, wherein the spectral intensity distribution $E_s$ of the solar light used for computing the $T_V$-value matches CIE Standard illuminant D65.

5. The ophthalmic tinted lens according to claim 1, further having a value of a blue-violet protection factor $F_{BV}$ for quantifying an efficiency of the lens to protect the human eye against hazard due to blue-violet solar light, said blue-violet protection factor $F_{BV}$ being computed as 100 minus another value which quantifies a third light amount ratio which relates to light belonging to the wavelength range 415 nm to 455 nm and also transmitted through the lens,
   wherein the $T_V$-value and the $F_{BV}$-value expressed as percentage values meet the following condition: $F_{BV} > -0.7 \times T_V + 107$ if $10\% \leq T_V \leq 92\%$.

6. The ophthalmic tinted lens according to claim 5, wherein the blue-violet protection factor $F_{BV}$ is computed as 100 minus an average value of the spectral transmittance values $T(\lambda)$ across the wavelength range 415 nm to 455 nm, said range corresponding to maximum retinal hazard due to blue-violet light.

7. The ophthalmic tinted lens according to claim 6, wherein $$F_{BV} = 100 - \frac{1}{40} \cdot \int_{415\,nm}^{455\,nm} T(\lambda) \cdot d\lambda.$$

8. The ophthalmic tinted lens according to claim 5, wherein the $F_C$-value and the $F_{BV}$-value expressed as percentage values meet the following condition: $F_C > -1.0 \times F_{BV} + 124$.

9. The ophthalmic tinted lens according to claim 5, wherein a global efficiency factor $F_{TOT}$ equal to a sum of the $F_C$-value and $F_{BV}$-value expressed as percentage values, divided by two, is higher than 62%.

10. Solar protection equipment, comprising a spectacle frame suitable for fitting on a wearer's face, and two ophthalmic tinted lenses each ophthalmic tinted lens having a visual transmission value $T_V$ for quantifying a first light intensity ratio which relates to light effective for human vision and transmitted through the lens in daylight condition, and a value of a chronobiological factor $F_C$ for quantifying a second light amount ratio which relates to light effective for a non-visual physiological effect and also transmitted through the lens, the light effective for the non-visual physiological effect being also involved in the human vision,
   wherein the $T_V$-value and the $F_C$-value expressed as percentage values meet the following condition: $F_C > 1.1 \times T_V + 13.0$ with $3\% \leq T_V \leq 43\%$, or $F_C > 0.7 \times T_V + 30.2$ with $43\% < T_V \leq 92\%$.

11. The ophthalmic tinted lens according to claim 3, wherein the spectral intensity distribution $E_s$ of the solar light used for computing the $T_V$-value matches CIE Standard illuminant D65.

12. The ophthalmic tinted lens according to claim 2, further having a value of a blue-violet protection factor $F_{BV}$ for quantifying an efficiency of the lens to protect the human eye against hazard due to blue-violet solar light, said blue-violet protection factor $F_{BV}$ being computed as 100 minus another value which quantifies a third light amount ratio which relates to light belonging to the wavelength range 415 nm to 455 nm and also transmitted through the lens,
   wherein the $T_V$-value and the $F_{BV}$-value expressed as percentage values meet the following condition: $F_{BV} > -0.7 \times T_V + 107$ if $10\% \leq T_V \leq 92\%$.

13. The ophthalmic tinted lens according to claim 3, further having a value of a blue-violet protection factor $F_{BV}$ for quantifying an efficiency of the lens to protect the human eye against hazard due to blue-violet solar light, said blue-violet protection factor $F_{BV}$ being computed as 100 minus another value which quantifies a third light amount ratio which relates to light belonging to the wavelength range 415 nm to 455 nm and also transmitted through the lens,
   wherein the $T_V$-value and the $F_{BV}$-value expressed as percentage values meet the following condition: $F_{BV} > -0.7 \times T_V + 107$ if $10\% \leq T_V \leq 92\%$.

14. The ophthalmic tinted lens according to claim 4, further having a value of a blue-violet protection factor $F_{BV}$ for quantifying an efficiency of the lens to protect the human eye against hazard due to blue-violet solar light, said blue-violet protection factor $F_{BV}$ being computed as 100 minus another value which quantifies a third light amount ratio which relates to light belonging to the wavelength range 415 nm to 455 nm and also transmitted through the lens,
   wherein the $T_V$-value and the $F_{BV}$-value expressed as percentage values meet the following condition: $F_{BV} > -0.7 \times T_V + 107$ if $10\% \leq T_V \leq 92\%$.

15. The ophthalmic tinted lens according to claim 11, further having a value of a blue-violet protection factor $F_{BV}$ for quantifying an efficiency of the lens to protect the human eye against hazard due to blue-violet solar light, said blue-violet protection factor $F_{BV}$ being computed as 100 minus another value which quantifies a third light amount ratio which relates to light belonging to the wavelength range 415 nm to 455 nm and also transmitted through the lens,
   wherein the $T_V$-value and the $F_{BV}$-value expressed as percentage values meet the following condition: $F_{BV} > -0.7 \times T_V + 107$ if $10\% \leq T_V \leq 92\%$.

16. The ophthalmic tinted lens according to claim 6, wherein the $F_C$-value and the $F_{BV}$-value expressed as percentage values meet the following condition: $F_C > -1.0 \times F_{BV} + 124$.

17. The ophthalmic tinted lens according to claim 7, wherein the $F_C$-value and the $F_{BV}$-value expressed as percentage values meet the following condition: $F_C > -1.0 \times F_{BV} + 124$.

18. The ophthalmic tinted lens according to claim 6, wherein a global efficiency factor $F_{TOT}$ equal to a sum of the $F_C$-value and $F_{BV}$-value expressed as percentage values, divided by two, is higher than 62%.

19. The ophthalmic tinted lens according to claim 7, wherein a global efficiency factor $F_{TOT}$ equal to a sum of the $F_C$-value and $F_{BV}$-value expressed as percentage values, divided by two, is higher than 62%.

20. The ophthalmic tinted lens according to claim 8, wherein a global efficiency factor $F_{TOT}$ equal to a sum of the $F_C$-value and $F_{BV}$-value expressed as percentage values, divided by two, is higher than 62%.

* * * * *